United States Patent
Wagmann et al.

(10) Patent No.: US 12,467,392 B2
(45) Date of Patent: Nov. 11, 2025

(54) MUFFLER, EXHAUST SYSTEM INCLUDING A MUFFLER, AND METHOD OF MAKING A MUFFLER FOR AN EXHAUST SYSTEM

(71) Applicant: Purem GmbH, Neunkirchen (DE)

(72) Inventors: Martin Wagmann, St. Wendel (DE); Felix Hackländer, Esslingen (DE)

(73) Assignee: Purem GmbH, Neunkirchen (DE)

( * ) Notice: Subject to any disclaimer, the term of this patent is extended or adjusted under 35 U.S.C. 154(b) by 85 days.

(21) Appl. No.: 18/331,775

(22) Filed: Jun. 8, 2023

(65) Prior Publication Data
US 2023/0399963 A1  Dec. 14, 2023

(30) Foreign Application Priority Data
Jun. 9, 2022 (DE) .................. 10 2022 114 527.1

(51) Int. Cl.
*F01N 1/08* (2006.01)
*F01N 13/18* (2010.01)

(52) U.S. Cl.
CPC ......... *F01N 1/089* (2013.01); *F01N 13/1861* (2013.01); *F01N 2470/02* (2013.01); *F01N 2490/08* (2013.01)

(58) Field of Classification Search
CPC .. F01N 1/089; F01N 13/1861; F01N 2490/08; F01N 2470/02
See application file for complete search history.

(56) References Cited

U.S. PATENT DOCUMENTS

| | | | |
|---|---|---|---|
| 7,159,692 B1 * | 1/2007 | Frederiksen | F01N 1/08 181/227 |
| 2009/0045006 A1 * | 2/2009 | Kondo | H01M 8/0662 181/252 |

FOREIGN PATENT DOCUMENTS

| | | |
|---|---|---|
| DE | 196 39 079 A1 | 3/1998 |
| JP | H0557308 U * | 7/1993 |

OTHER PUBLICATIONS

English translation of DE 19639079 A1, accessed Oct. 30, 2024 via Espacenet, <https://translationportal.epo.org/emtp/translate/?ACTION=description-retrieval&COUNTRY=DE&ENGINE=google&FORMAT=docdb&KIND=A1&LOCALE=en_EP&NUMBER=19639079&SRCLANG=de&TRGLANG=en> (Year: 1996).*

English translation of JP-H0557308-U, accessed Apr. 11, 2025 via Espacenet, <https://translationportal.epo.org/emtp/translate/?ACTION=description-retrieval&COUNTRY=JP&ENGINE=google&FORMAT=docdb&KIND=U&LOCALE=en_EP&NUMBER=H0557308&SRCLANG=ja&TRGLANG=en> (Year: 1993).*

* cited by examiner

*Primary Examiner* — Jeremy A Luks
(74) *Attorney, Agent, or Firm* — Walter Ottesen, P.A.

(57) ABSTRACT

A muffler for an exhaust system of an internal combustion engine includes at least one muffler component with a perforation defined by a plurality of through-flow openings in a wall of the muffler component. The through-flow openings can be flowed through in a flow direction in the direction from an upstream side of the wall to a downstream side of the wall. At least in the case of some or all of the through-flow openings of the perforation, a through-flow opening flow cross section decreases in the flow direction in order to provide a through-flow opening flow-guiding surface.

14 Claims, 3 Drawing Sheets

MUFFLER, EXHAUST SYSTEM INCLUDING A MUFFLER, AND METHOD OF MAKING A MUFFLER FOR AN EXHAUST SYSTEM

CROSS-REFERENCE TO RELATED APPLICATIONS

This application claims priority of German patent application no. 10 2022 114 527.1, filed Jun. 9, 2022, the entire content of which is incorporated herein by reference.

TECHNICAL FIELD

The present disclosure relates to a muffler which can be used, for example, in an exhaust system of an internal combustion engine in order to dampen noises which arise during the working of the internal combustion engine.

BACKGROUND

Such mufflers, which can be used in exhaust systems of internal combustion engines, generally include an outer wall surrounding a muffler interior. In the muffler interior, the exhaust gas emitted by an internal combustion engine is guided through one or more exhaust gas conduit pipes, each of which provides muffler components. Furthermore, one or more partition walls providing muffler components can be provided in the muffler interior, via which components muffler chambers fulfilling various functions are separated from one another, for example.

In order to bring various volume regions in the muffler interior into flow connection with one another in such a muffler, perforations with a plurality of generally comparatively small and close together through-flow openings can be formed in one or more muffler components, for example one or more exhaust gas conduit pipes or/and one or more partition walls. The through-flow openings of such a perforation serve for the direct passage of exhaust gas and are not intended, for example in the case of formation in a partition wall, to receive exhaust gas conduit pipes in order to connect these to such a partition wall and also to conduct the exhaust gas passed through such an exhaust gas conduit pipe through the partition wall. Through such through-flow openings of a perforation, exhaust gas can flow, for example, from the volume formed in the interior of an exhaust gas conduit pipe into the volume surrounding the exhaust gas conduit pipe, or exhaust gas can flow from one of two chambers separated by a partition wall into the other of the two chambers separated by this partition wall if such a perforation is formed in the partition wall.

SUMMARY

It is an object of the present disclosure to provide a muffler for an exhaust system of an internal combustion engine which achieves improved flow guidance in combination with improved muffling behavior.

According to the disclosure, this object is achieved by a muffler for an exhaust system of an internal combustion engine, including at least one muffler component with a perforation including a plurality of through-flow openings in a wall of the muffler component, wherein the through-flow openings can be flowed through in a flow direction in the direction from an upstream side of the wall to a downstream side of the wall, wherein, at least in the case of some of the through-flow openings, preferably all of the through-flow openings, of the perforation, a through-flow opening flow cross section decreases in the flow direction in order to provide a through-flow opening flow-guiding surface.

As a result of the provision of flow-guiding surfaces at through-flow openings in components of mufflers which decrease in their flow cross section in the flow direction, the exhaust gas expelled by an internal combustion engine, for example, is guided out of the region of larger flow cross section into the region of smaller flow cross section of a respective through-flow opening. Turbulence which occurs in the exhaust gas flow in the region of the through-flow openings is thereby reduced, contributing, on the one hand, to the lowering of flow resistance and, on the other hand, to the reduced generation of noise during flow through such a perforation.

For optimized flow guidance, the through-flow opening flow cross section can decrease degressively in the flow direction.

This can be achieved, for example, in that the through-flow opening flow cross section decreases with a rounded cross-section change profile. Particularly advantageous for avoiding the formation of turbulence is an embodiment in which the through-flow opening flow cross section decreases with a substantially edge-free cross-section change profile.

In order to prevent turbulence also at the connection of a respective through-flow opening flow-guiding surface on the upstream side of the wall of the muffler component, it is proposed that the through-flow opening flow-guiding surface adjoins the upstream side of the wall substantially without edges.

The through-flow opening flow cross section can decrease, for example, in a first through-flow opening opening-length region corresponding to a wall thickness of the wall between the upstream side of the wall and the downstream side of the wall.

A more pronounced capacity for flow guidance by the through-flow openings can be achieved, for example, if, in association with at least some of the through-flow openings, preferably all of the through-flow openings, a through-flow extension is provided which projects in the downstream direction beyond the downstream side of the wall and annularly surrounds a respective through-flow opening in a second through-flow opening opening-length region. In the case of at least some of the through-flow extensions, preferably all of the through-flow extensions, the through-flow opening flow cross section of each through-flow opening surrounded by one of the through-flow extensions can decrease in the second through-flow opening opening-length region.

In order to achieve the degressive decrease in the through-flow opening flow cross section, the through-flow opening flow cross section can decrease to a greater extent in the first through-flow opening opening-length region than in the second through-flow opening opening-length region.

For efficient avoidance of flow turbulence in the region of the through-flow openings, an angle of inclination of the through-flow opening flow-guiding surfaces with respect to an opening center axis is in a range of from 5° to 15° in the region of an outlet end of a respective through-flow opening.

The at least one muffler component can be configured, for example, as an exhaust gas conduit pipe, wherein if a plurality of exhaust gas conduit pipes is provided in a muffler, such a perforation with the through-flow opening structure configured according to the disclosure can be provided in just one or just some of the exhaust gas conduit pipes or in each exhaust gas conduit pipe. Alternatively or in addition, the at least one muffler component can be configured as a partition wall which separates two muffler chambers from one another. In this case too, if a plurality of partition walls is provided in a muffler, a perforation with the structure according to the disclosure of the through-flow openings can be provided in one or in some of the partition walls or in each partition wall.

The disclosure further relates to an exhaust system for an internal combustion engine, including at least one muffler constructed according to the disclosure.

Furthermore, the disclosure relates to a method for producing a muffler with the structure described above, which method is distinguished by the fact that:

the at least one muffler component is constructed with metal material, and rim holes are formed in the wall of the muffler component in order to provide the through-flow opening flow-guiding surfaces, or the at least one muffler component is configured as a plastic molding, and the through-flow opening flow-guiding surfaces are molded onto the wall of the muffler component.

BRIEF DESCRIPTION OF THE DRAWINGS

The invention will now be described with reference to the drawings wherein.

DETAILED DESCRIPTION

Figure 1:
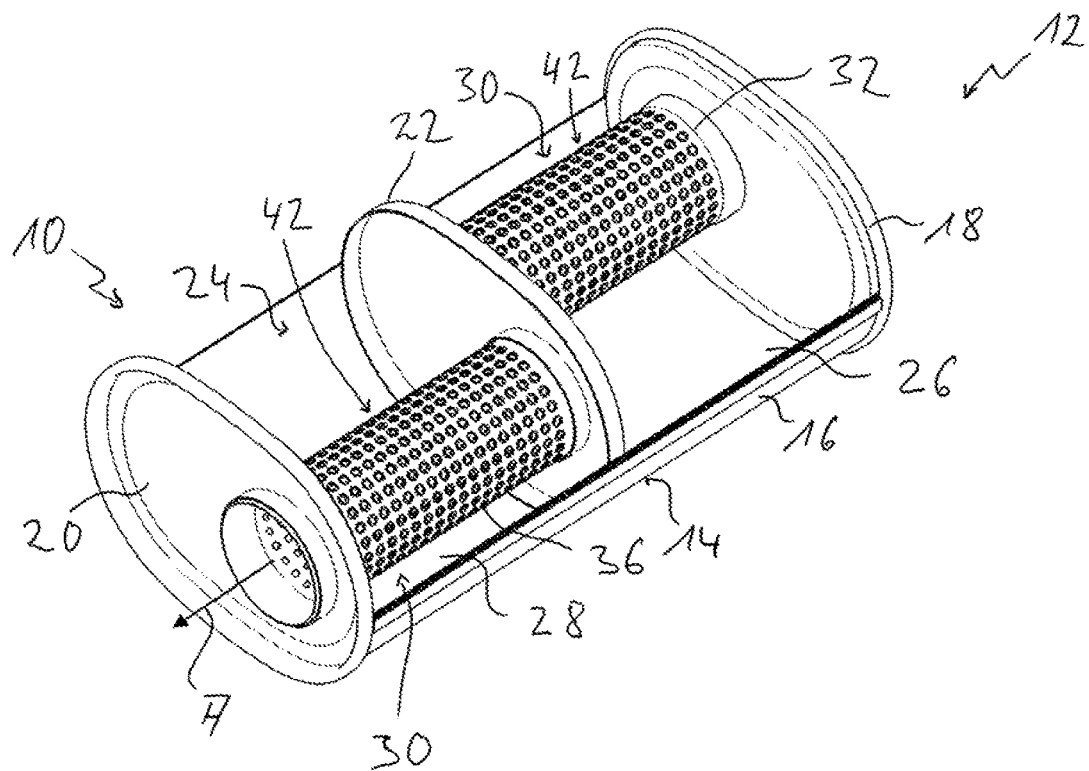
FIG. 1 shows a muffler of an exhaust system of an internal combustion engine with a muffler housing illustrated in the partially open state.

FIG. 1 illustrates, by way of example, a muffler, denoted in general by 10, of an exhaust system 12 for an internal combustion engine. The muffler 10 includes a muffler housing 14, which in the example illustrated includes a substantially cylindrical circumferential wall 16 and two end walls 18, 20 provided at the axial ends thereof. Provided in the interior of the muffler housing 14 is a partition wall 22, which divides the interior 24 of the muffler into two chambers 26, 28.

Figure 3:
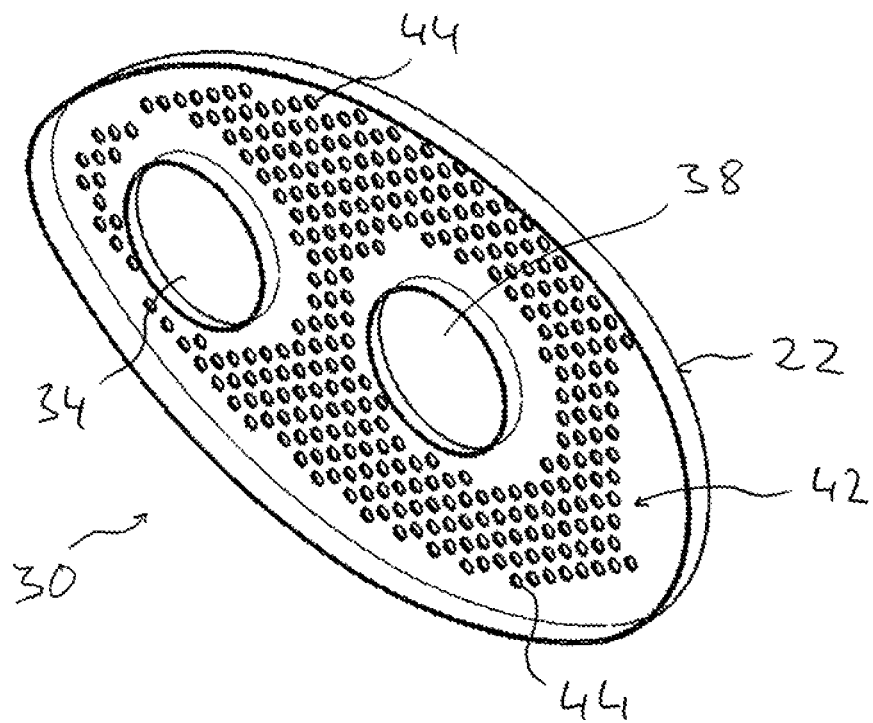
FIG. 3 shows a perspective illustration of a partition wall which can be used as a muffler component, for example, of the muffler of FIG. 1.

In the chamber 26, an exhaust gas conduit pipe 32 providing a muffler component 30 extends between the end wall 18 and the partition wall 22. In its end region adjoining the partition wall 22, the exhaust gas conduit pipe 32 can be closed off by the partition wall 22, or, as illustrated in the case of the partition wall 22 illustrated in FIG. 3, can be open in its axial end region adjoining the partition wall 22 to an opening 34 formed in the partition wall 22, for example with a rim hole, and thus to the chamber 28.

Extending in the chamber 28 is an exhaust gas conduit pipe 36, which provides a further muffler component 30 and is open in its end region adjoining the partition wall 22, via an opening 38 formed, for example, by a rim hole in the partition wall 22, to the chamber 26. The exhaust gas conduit pipe 32 can provide an inlet pipe of the muffler 10 or can connect to it in the region of the end wall 18, for example. The exhaust gas conduit pipe 36 can provide an outlet pipe of the muffler 10 or can connect to it in the region of the end wall 20. If, in the muffler 10 illustrated by way of example in FIG. 1, the exhaust gas conduit pipe 32 is closed off by the partition wall 22 in its end region adjoining the partition wall 22, the exhaust gas A entering the muffler via the exhaust gas conduit pipe 32 passes via the perforation 42 into the chamber 26 and from the chamber 26 into the exhaust gas conduit pipe 36, via which the exhaust gas A leaves the muffler 10. In this case, the chamber 28 can act in the manner of a resonator chamber for sound damping. If the exhaust gas conduit pipe 32 is open to the chamber 28 via the opening 34 in the partition wall 22 when the partition wall 22 is configured in the manner illustrated in FIG. 3, exhaust gas A entering the exhaust gas conduit pipe 32 can enter the exhaust gas conduit pipe 36 via the perforation 42 in the exhaust gas conduit pipe 32 and the chamber 26 as well as via the chamber 28 and the perforation 42 in the exhaust gas conduit pipe 36 and can exit the muffler 10 via the latter.

It should be noted that the explanation given with reference to FIG. 1 relates only to an illustrative construction of a very simply structured muffler 10 as regards the essential system regions of such a muffler. It is, of course, possible for a plurality of chambers, separated from one another by respective partition walls, to be formed in the muffler housing of such a muffler and for more than the two exhaust gas conduit pipes illustrated to be provided in order to conduct the exhaust gas flowing through the muffler in a defined manner through the latter and the chambers formed therein.

Figure 2:
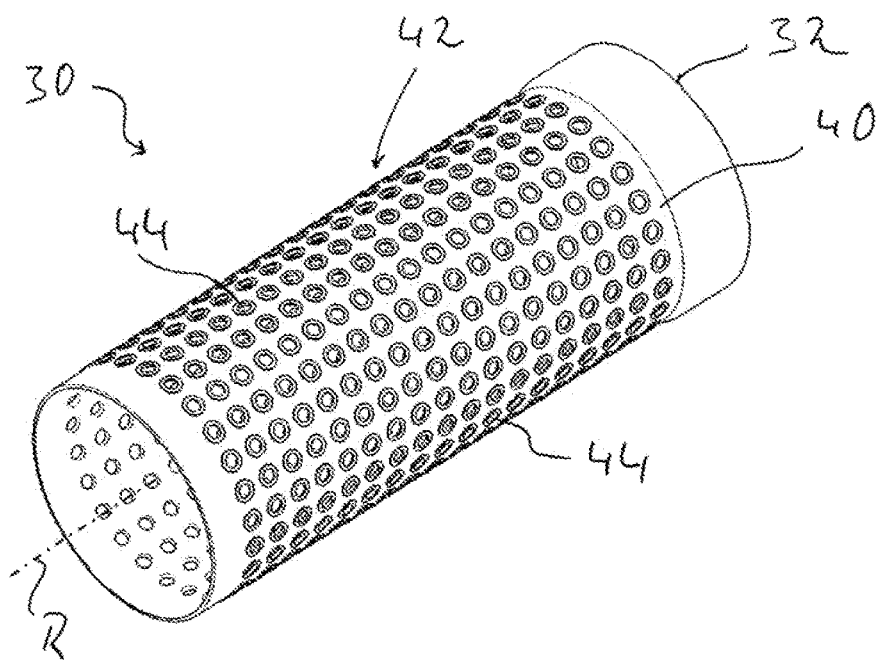
FIG. 2 shows a perspective illustration of an exhaust gas conduit pipe which can be used as a muffler component, for example, of the muffler of FIG. 1.

FIG. 2 illustrates, for example, on the basis of the exhaust gas conduit pipe 32 providing a muffler component 30, that a perforation, denoted in general by 42, having a multiplicity of through-flow openings 44 can be formed in a wall 40 thereof. It is also possible, in corresponding fashion, for a perforation 42 of this kind illustrated in FIG. 3, having a multiplicity of comparatively small and close together through-flow openings 44 through which the exhaust gas flowing through the muffler 10 can flow also to be formed in a wall of the exhaust gas conduit pipe 36 or in the partition wall 22.

Figure 4:
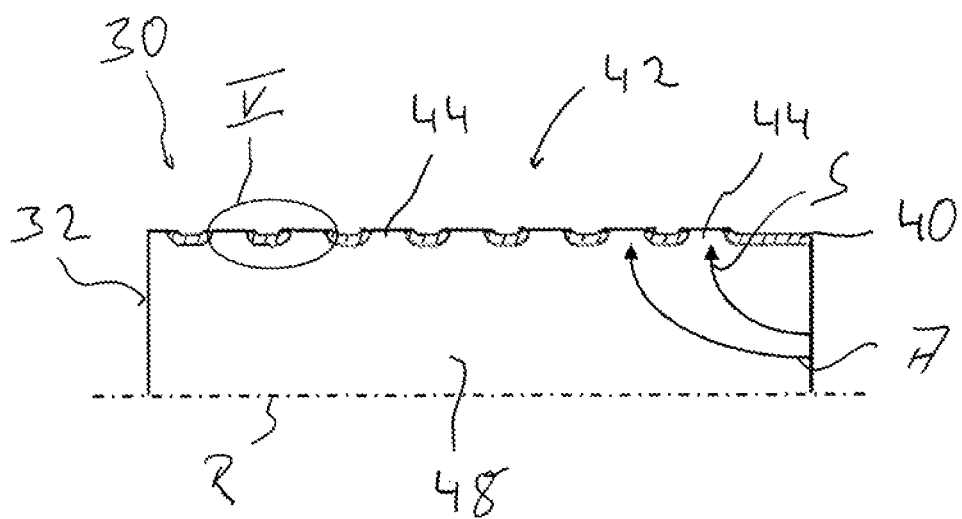
FIG. 4 shows a partial longitudinal sectional view of an exhaust gas conduit pipe which can be used as a muffler component, for example, of the muffler of FIG. 1.

The structure of the perforation 42 or of the through-flow openings 44 thereof is explained in detail below with reference to FIGS. 4 and 5. It should be noted that a perforation with through-flow openings structured in this way can be provided both in a wall of a muffler component configured as an exhaust gas conduit pipe and in a wall of a muffler component configured as a partition wall.

These figures show, for example on the basis of the exhaust gas conduit pipe 32 providing a muffler component 30, how the structure of the through-flow openings 44 is matched to the flow guidance in the muffler 10. In particular, it can be seen that, in the case of the exhaust gas conduit pipe 32, the exhaust gas A which is expelled by an internal combustion engine and is to flow in the exhaust system 12 toward the muffler 10, enters a volume 48 delimited by the wall 40 of the exhaust gas conduit pipe 32 and can flow through the perforation 42 formed in the wall 40 or through the through-flow openings 44 of the perforation in the example illustrated into the chamber 26. In this case, in the region of each of the through-flow openings 44, the exhaust gas A flows substantially in a flow direction S from the volume 48 into the chamber 26 which can correspond approximately to a direction of extent of an opening center axis O of the through-flow openings 44. Taking into account the fact that the exhaust gas A fundamentally flows in the direction of a pipe longitudinal axis R through the volume 48 in the exhaust gas conduit pipe 32, the flow direction S can be set in the direction of the pipe longitudinal axis R in relation to the direction of extent of the center axis O of the opening of a respective through-flow opening 44.

Figure 5:
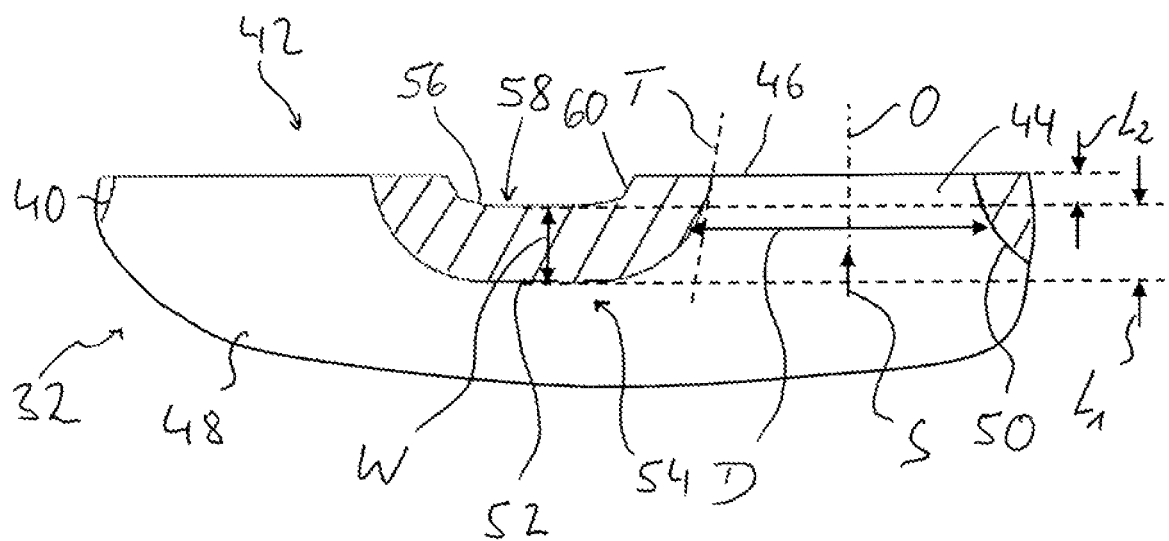
FIG. 5 shows an enlarged illustration of the detail V in FIG. 4.

It can be seen in FIG. 5 that preferably each of the through-flow openings 44 is formed in such a way that, in the flow direction S or in the direction of the opening center axis O, a flow cross section D illustrated in FIG. 5 via the opening diameter decreases in the flow direction S and provides a respective through-flow opening flow-guiding surface 50 via the cross-section change profile. In the example illustrated, the through-flow opening flow-guiding surface 50 formed in the region of each through-flow opening 44 adjoins an upstream side 54 of the wall 40, the side providing an inner surface 52 of the exhaust gas conduit pipe 32, substantially without an edge-like or step-like transition and provides a basically rounded, edge-free cross-section change profile.

In the region preferably of each through-flow opening 44, a through-flow extension 60 is formed which projects in the downstream direction beyond a downstream side 58 of the wall 40 of the exhaust gas conduit pipe 32, which side provides an outer circumferential surface 56. If the exhaust gas conduit pipe 32 is constructed as a metal component, for example with sheet metal material, the through-flow extensions 60 can be formed as rim holes in the region of the through-flow openings 44 by using corresponding shaping tools during the forming of a metal blank. If the exhaust gas conduit pipe 32 is produced as a plastic molding, for example in a die casting process or a deep-drawing process, the through-flow extensions 60 can be molded onto the exhaust gas conduit pipe 32 during the die casting process by using corresponding dies.

By providing the through-flow extensions 60, the through-flow openings 44 are formed with two through-flow opening opening-length regions L1, L2 which follow one another in the flow direction S. The first through-flow opening opening-length region L1 corresponds substantially to that section of the extent of a respective through-flow opening 44 which corresponds to the wall thickness W of the wall 40 of the exhaust gas conduit pipe 32. The second through-flow opening opening-length region L2 which then adjoins in the flow direction S corresponds to that section of the extent in which a respective through-flow extension 60 projects outward beyond the downstream side 58 of the wall 40.

In the illustrated embodiment, in which a respective through-flow opening flow-guiding surface 50 is rounded in the flow direction S and thus the through-flow opening flow cross section D, that is, for example, the diameter in the case of a circular configuration of the through-flow openings 44, decreases degressively in the flow direction S, that is, substantially in the direction of the opening center axis O, the through-flow opening flow cross section D changes to a greater extent in the first through-flow opening opening-length region L1 than in the second through-flow opening opening-length region L2. Since the through-flow opening opening cross section D changes, that is, decreases, in the flow direction S over the entire region of extent of a respective through-flow opening 44, a comparatively large radius of curvature for the through-flow opening flow-guiding surface 50 can be provided by the provision of the through-flow extensions 60 and the thus larger length of extent of a respective through-flow opening 44 in the flow direction S compared to the wall thickness W, thus ensuring that the exhaust gas A flowing through the volume 48 and flowing radially outward in relation to the pipe longitudinal axis R of the exhaust gas conduit pipe 32, approximately in the flow direction S, through the through-flow openings 44 is introduced into the through-flow openings 44 in a comparatively gentle manner and without the formation of significant turbulence. Thus, as exhaust gas A passes through the perforation 42, a flow resistance which is significantly reduced in comparison with, for example, a sharp-edged transition from the upstream side 54 to the through-flow openings 44 can be achieved, and the risk of noise occurring in this transition region as a result of turbulence can be significantly reduced.

In FIG. 5, it can be seen from a tangent line T that, owing to the provision of the through-flow extensions 60 in association with the through-flow openings 44 of the perforation 42, the through-flow opening flow-guiding surface 50, which extends in a curved manner in the flow direction S or in the direction of the opening center axis O of a respective through-flow opening 44, is virtually parallel to the opening center axis O in the region of an outlet end 46 of a respective through-flow opening 44 or is inclined at a comparatively small angle in the range of 5°-15°. This supports the reduction of turbulence in the exhaust gas flow, particularly in the region of the outlet ends 46 of the through-flow openings 44.

Figure 6:
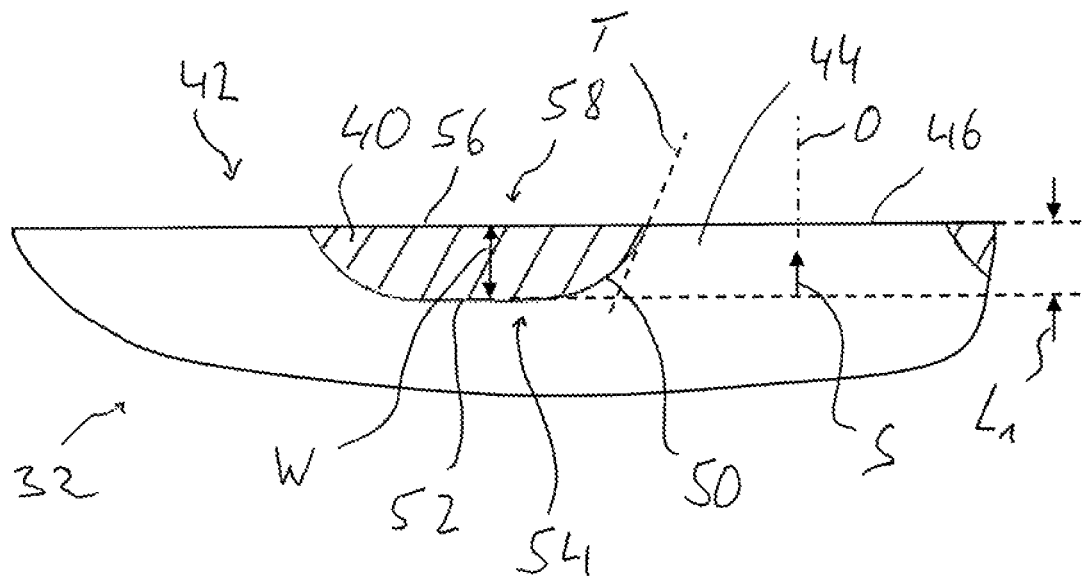
FIG. 6 shows an illustration, corresponding to FIG. 5, of an alternative embodiment of a muffler component.

An alternative embodiment of a muffler component 30 is illustrated in FIG. 6 via an alternative embodiment of the exhaust gas conduit pipe 32, for example. In this embodiment, no through-flow extensions projecting beyond the downstream side 58 are provided on the wall 40 of the exhaust gas conduit pipe 32. This means that the length of extent of the through-flow openings 44 in the flow direction S corresponds substantially to the length of extent of the first through-flow opening opening-length regions L1, the length corresponding to the wall thickness W of the wall 40. In such an embodiment too, the through-flow openings 44 can be provided with a through-flow opening flow cross section D that decreases in the flow direction S and with the through-flow opening flow-guiding surfaces 50, which are rounded, for example. It can be clearly seen when comparing FIGS. 5 and 6 that, with substantially the same profile, that is, cross-section change profile, of the through-flow opening flow-guiding surfaces 50 in the first through-flow opening opening-length region L1, the tangent line T at the outlet end 46 of a respective through-flow opening 44 is angled more steeply with respect to the opening center axis O in the embodiment according to FIG. 6 than in the embodiment of FIG. 5 having the through-flow extensions 60 at the through-flow openings 44.

The variant of a muffler component 30 illustrated in FIG. 6 can be provided particularly advantageously if the component is produced as a plastic molding, for example in a die-casting process, in which the through-flow openings 44 and the through-flow opening flow-guiding surfaces 50 delimiting them are produced by corresponding shaping of the die parts of a casting die.

It should be noted that the principles of the present disclosure can also be applied when the through-flow openings 44 are provided basically with a different structure. For example, these could be configured as elongate hole-like openings through which the exhaust gas A flows and which are delimited by respective through-flow opening flow-guiding surfaces 50. Provision may also be made for the radius of curvature of the through-flow opening flow-guiding surfaces 50 to change. For example, this radius of curvature could be greater in the region adjacent to the upstream side 54 than in the region adjacent to the downstream side 58 or in the second through-flow opening opening-length regions L2 formed in a respective through-flow extension 60.

It should also be noted that, depending on the flow direction, in the case of a tubular configuration of a muffler component, the through-flow openings can also be provided for the purpose of introducing exhaust gas into the volume delimited by a wall of the tubular exhaust gas guiding component. In this case, the upstream side of the wall of such a tubular muffler component forms the outer circumferential surface, while the downstream side provides the inner circumferential surface and, for example, through-flow extensions are then configured to project radially inward. It should also be noted that the through-flow openings of such a perforation can be arranged in a different pattern than that illustrated in the figures, and that not all the openings of such a perforation have to be of the same size. Correspondingly, through-flow extensions provided, for example, in association with through-flow openings, configured with different cross sections, of such a perforation can also have different lengths of extent in the flow direction. In association with larger-dimensioned through-flow openings, for example, the through-flow extensions can have a longer length of extent than in association with smaller-dimensioned through-flow openings.

In a further alternative embodiment, the decreasing flow cross section could also be achieved in that the through-flow opening flow-guiding surfaces are configured with a substantially frustoconical structure or a plurality of sections which follow one another in the flow direction and have a substantially frustoconical structure in order, by this means too, to achieve a degressive decrease in the flow cross section of the through-flow openings in the flow direction. However, owing to the turbulence that unavoidably occurs in the region of edge-type transitions, the rounded structure, illustrated in the figures, of the through-flow opening flow-guiding surfaces in the flow direction is preferred.

It is understood that the foregoing description is that of the preferred embodiments of the invention and that various changes and modifications may be made thereto without departing from the spirit and scope of the invention as defined in the appended claims.

The invention claimed is:

1. A muffler for an exhaust system of an internal combustion engine, the muffler comprising:
   at least one muffler component including a wall having a perforation defined by a plurality of through-flow openings formed therein, said through-flow openings defining an opening center axis (O);
   said wall having an upstream side and a downstream side;
   said through-flow openings being provided to accommodate a flowthrough in a flow direction(S) in a direction from said upstream side to said downstream side of said wall; and,
   at least a portion of said through-flow openings each being configured to have a through-flow opening flow cross section decreasing in said flow direction(S) to provide a through-flow opening flow-guide surface, said through-flow opening flow-guide surfaces and a corresponding one of said opening center axes (O) conjointly defining an angle lying in a range of from 5° to 15° in the region of an outlet end of the corresponding through-flow opening.

2. The muffler of claim 1, wherein said through-flow opening flow cross section decreases degressively in said flow direction(S).

3. The muffler of claim 1, wherein at least one of the following applies:
   i) said through-flow opening flow cross section decreases with a rounded cross-section change profile; and,
   ii) said through-flow opening flow cross section decreases with an edge-free cross-section change profile.

4. The muffler of claim 1, wherein said through-flow opening flow-guide surface adjoins the upstream side of said wall without edges.

5. The muffler of claim 1, wherein said wall has a wall thickness (W); and, said through-flow opening flow cross section decreases in a first through-flow opening opening-length region (L1) corresponding to said wall thickness (W) between said upstream side of said wall and said downstream side of said wall.

6. The muffler of claim 1, wherein, in association with said at least a portion of said through-flow openings, a through-flow extension is provided which projects in the downstream direction beyond said downstream side of said wall and annularly surrounds a corresponding through-flow opening in a second through-flow opening opening-length region (L2).

7. The muffler of claim 6, wherein, with respect to at least a portion of the through-flow extensions, said through-flow opening flow cross section of each through-flow opening surrounded by one of said through-flow extensions decreases in said second through-flow opening opening-length region (L2).

8. The muffler of claim 7, wherein:
   said wall has a wall thickness (W), said through-flow opening flow cross section decreasing in a first through-flow opening opening-length region (L1) corresponding to said wall thickness (W) between said upstream side of said wall and said downstream side of said wall; and,
   said through-flow opening flow cross section decreases to a greater extent in said first through-flow opening opening-length region (L1) than in the second through-flow opening opening-length region (L2).

9. The muffler of claim 1, wherein at least one of the following applies:
   i) said at least one muffler component is configured as an exhaust gas conduit pipe; and,
   ii) said at least one muffler component is configured as a partition wall separating two muffler chambers from one another.

10. An exhaust system comprising:
    an exhaust gas conduit pipe for conducting exhaust gas from the internal combustion engine;
    a muffler connected to said exhaust gas conduit pipe;
    said muffler including:
    at least one muffler component including a wall having a perforation defined by a plurality of through-flow openings formed therein, said through-flow openings defining an opening center axis (O);
    said wall having an upstream side and a downstream side;
    said through-flow openings being provided to accommodate a flowthrough in a flow direction(S) in a direction from said upstream side to said downstream side of said wall; and,
    at least a portion of said through-flow openings each being configured to have a through-flow opening flow cross section decreasing in said flow direction(S) to provide a through-flow opening flow-guide surface, said through-flow opening flow-guide surfaces and a corresponding one of said opening center axes (O)

conjointly defining an angle lying in a range of from 5° to 15° in the region of an outlet end of the corresponding through-flow opening.

11. A method of making a muffler, the muffler including at least one muffler component including a wall having a perforation defined by a plurality of through-flow openings formed therein, said through-flow openings defining an opening center axis (O); said wall having an upstream side and a downstream side; said through-flow openings being provided to accommodate a flowthrough in a flow direction (S) in a direction from said upstream side to said downstream side of said wall; at least a portion of said through-flow openings each being configured to have a through-flow opening flow cross section decreasing in said flow direction (S) to provide a through-flow opening flow-guide surface, said through-flow opening flow-guide surfaces and a corresponding one of said opening center axes (O) conjointly defining an angle lying in a range of from 5° to 15° in the region of an outlet end of the corresponding through-flow opening; the method comprising:
- making the at least one muffler component with metal material; and,
- forming rim holes in the wall of said at least one muffler component in order to provide the through-flow opening flow guide surface; or,
- configuring the at least one muffler component as a plastic molding; and,
- molding the through-flow opening flow-guide surfaces onto the wall of the at least one muffler component.

12. A muffler for an exhaust system, the muffler comprising:
- at least one muffler component including a wall having a perforation defined by a plurality of through-flow openings formed therein, said through-flow openings defining an opening center axis (O);
- said wall having an upstream side and a downstream side;
- said through-flow openings being provided to accommodate a flowthrough in a flow direction(S) in a direction from said upstream side to said downstream side of said wall;
- at least a portion of said through-flow openings being configured to have a through-flow opening flow cross section decreasing in said flow direction(S) in a first through-flow opening opening-length region (L1) corresponding to said wall thickness (W) between said upstream side of said wall and said downstream side of said wall to provide a through-flow opening flow-guide surface;
- a length of extent of said through-flow openings in said flow direction(S) corresponding to a length of extent of said first through-flow opening opening-length region (L1) in said flow direction(S); and,
- each of said through-flow opening flow-guide surfaces and a corresponding one of said opening center axes (O) conjointly defining an angle lying in a range of from 5° to 15° in the region of an outlet end of the corresponding through-flow opening.

13. An exhaust system comprising:
- an exhaust gas conduit pipe for conducting exhaust gas from the internal combustion engine;
- a muffler connected to said exhaust gas conduit pipe;
- said muffler including:
- at least one muffler component including a wall having a perforation defined by a plurality of through-flow openings formed therein, said through-flow openings defining an opening center axis (O);
- said wall having an upstream side and a downstream side;
- said through-flow openings being provided to accommodate a flowthrough in a flow direction(S) in a direction from said upstream side to said downstream side of said wall;
- at least a portion of said through-flow openings being configured to have a through-flow opening flow cross section decreasing in said flow direction(S) in a first through-flow opening opening-length region (L1) corresponding to said wall thickness (W) between said upstream side of said wall and said downstream side of said wall to provide a through-flow opening flow-guide surface;
- a length of extent of said through-flow openings in said flow direction(S) corresponding to a length of extent of said first through-flow opening opening-length region (L1) in said flow direction(S); and,
- each of said through-flow opening flow-guide surfaces and a corresponding one of said opening center axes (O) conjointly defining an angle lying in a range of from 5° to 15° in the region of an outlet end of the corresponding through-flow opening.

14. A method of making a muffler for an exhaust system, the muffler including at least one muffler component including a wall having a perforation defined by a plurality of through-flow openings formed therein, said through-flow openings defining an opening center axis (O); said wall having an upstream side and a downstream side; said through-flow openings being provided to accommodate a flowthrough in a flow direction(S) in a direction from said upstream side to said downstream side of said wall; at least a portion of said through-flow openings being configured to have a through-flow opening flow cross section decreasing in said flow direction(S) in a first through-flow opening opening-length region (L1) corresponding to said wall thickness (W) between said upstream side of said wall and said downstream side of said wall to provide a through-flow opening flow-guide surface, said through-flow opening flow-guide surfaces and a corresponding one of said opening center axes (O) conjointly defining an angle lying in a range of from 5° to 15° in the region of an outlet end of the corresponding through-flow opening; and a length of extent of said through-flow openings in said flow direction(S) corresponding to a length of extent of said first through-flow opening opening-length region (L1) in said flow direction (S);
- the method comprising:
- configuring the at least one muffler component as a plastic molding; and,
- molding the through-flow opening flow-guide surfaces onto the wall of the at least one muffler component.

* * * * *